United States Patent

Sato et al.

[11] Patent Number: 6,089,113
[45] Date of Patent: Jul. 18, 2000

[54] SCREW FOR OPERATION AT HIGH SPEED AND HIGH LOAD

[75] Inventors: Mitsuo Sato; Hideo Itakura, both of Kanagawa, Japan

[73] Assignee: Aida Engineering Co., Ltd., Japan

[21] Appl. No.: 09/398,579

[22] Filed: Sep. 17, 1999

Related U.S. Application Data

[63] Continuation of application No. 08/892,627, Jul. 14, 1997.

[30] Foreign Application Priority Data

Feb. 19, 1997 [JP] Japan ......................... 9-50860

[51] Int. Cl.[7] ............................. F16H 29/02; F16H 57/04
[52] U.S. Cl. .............................. 74/89.15; 74/468
[58] Field of Search ........................... 74/89.15, 424.8 B, 74/464, 467, 468; 411/264, 158, 416, 417

[56] References Cited

U.S. PATENT DOCUMENTS

| | | | |
|---|---|---|---|
| 3,415,138 | 12/1968 | Rumbarger et al. ...................... | 74/468 |
| 3,454,136 | 7/1969 | Stark ........................................ | 74/467 |
| 3,541,875 | 11/1970 | Demorest ................................. | 74/468 |
| 3,651,706 | 3/1972 | Galbarini et al. ....................... | 74/467 X |
| 3,763,959 | 10/1973 | Neugebauer ............................. | 74/468 X |
| 4,741,220 | 5/1988 | Watanabe et al. ....................... | 74/468 X |
| 4,776,229 | 10/1988 | Zona ........................................ | 74/468 X |
| 5,261,810 | 11/1993 | Kamp et al. ............................ | 74/89.15 X |
| 5,488,880 | 2/1996 | Sartorio .................................. | 74/89.15 X |
| 5,961,267 | 10/1999 | Goss et al. .............................. | 411/416 |

FOREIGN PATENT DOCUMENTS

| | | | |
|---|---|---|---|
| 739204 | 1/1933 | France ..................................... | 74/468 |
| 769-155 | 10/1980 | Russian Federation ................. | 74/468 |
| 1710890-A1 | 2/1992 | Russian Federation ................. | 74/468 |

*Primary Examiner*—Charles A Marmor
*Assistant Examiner*—Roger Pang
*Attorney, Agent, or Firm*—Morrison Law Firm

[57] ABSTRACT

A corresponding pair of male and female screw members includes alternately disposed rising and falling sloped surfaces on threads of the male and female screw members along a sliding direction of the threads. Depressions and projections are disposed continuously in a direction perpendicular to the sliding direction. One of the depressions or one of the projections resides between each adjacent pair of the sloped surfaces. A lubricating oil is placed between the threads of the male and female screw parts. An incline angle of the sloped surfaces is selected appropriately to increase a wedging action of the sloped surfaces against the lubricating oil film which occurs when the male screw member is rotated with respect to the female screw member.

11 Claims, 6 Drawing Sheets

SCREW FOR OPERATION AT HIGH SPEED AND HIGH LOAD

This application is a continuation of pending application Ser. No. 08/892,627, filed Jul. 14, 1997.

BACKGROUND OF THE INVENTION

The present invention relates to a screw used for converting rotational and linear movement through the motions of mutually fitting male and female screw members. In particular, the present invention relates to a thread surface of a screw which is operated with a high relative speed and load. More specifically, the present invention is intended for supporting and adjusting a position of a slide in a machine press.

In general, when a male and female screw members are meshed and rotational and linear motion is converted via the relative motions of the screw members at relative high speeds and loads, wear of the screw members causes damage and ultimately results in the inoperability of the screw members. One method used to reduce wear includes applying a lubricating oil to a clearance area between the meshing sections of the male and female screw members. The lubricating oil prevents wear on the screw surface and also reduces the resistance on the screw thread surface.

Another method used for reducing wear resistance is a ball screw. A ball screw includes a ball interposed between a screw shaft and a nut (female screw member). This results in a rolling contact instead of a sliding contact between the screw members which reduces wear and provides high transfer efficiency.

In the former of the above methods, the lubricating oil between the male screw surface and the female screw surface tends to gradually break down which gradually increases the resistance between male screw and the female screw. As the resistance increases, the rate of wear of the parts increases until the clearance between the meshing sections is no longer adequate for the purpose of the high speed and high load operation. The breakdown of the oil film usually takes place when the load applied to the screw surface is great, making the screw unusable.

In the latter of the above methods, involving rolling contacts, the wear between the screw parts is decreased. However, the area of the interface between the two moving parts is small making the load capacity relatively small. Thus, the ball screw method for reducing wear is not suited for applications involving heavy loads.

OBJECTS AND SUMMARY OF THE INVENTION

It is an object of the present invention to provide a screw for high speed and heavy load operation which overcomes the above problems of the prior art.

It is another object of the present invention to provide a screw for high speed and heavy load operation having a large load capacity and low wear so that it can be used in high-speed applications.

It is yet another object of the present invention to provide a screw having a thread surface specifically designed for optimal wear resistance under high speed and heavy load operation.

To overcome the problems described above, the present invention involves a screw including upward and downward sloped sections along the threaded sections of a male screw and a female screw. The sloped surfaces are oriented along the sliding path of the threads of the screw. Depressions and projections are disposed between adjacent sloped surfaces in a direction perpendicular to the sliding direction.

Briefly, a corresponding pair of male and female screw members includes alternately disposed rising and falling sloped surfaces on threads of the male and female screw members along a sliding direction of the threads. Depressions and projections are disposed continuously in a direction perpendicular to the sliding direction. One of the depressions or one of the projections resides between each adjacent pair of the sloped surfaces. A lubricating oil is placed between the threads of the male and female screw parts. An incline angle of the sloped surfaces is selected appropriately to increase a wedging action of the sloped surfaces against the lubricating oil film which occurs when the male screw member is rotated with respect to the female screw member.

According to an embodiment of the present invention, there is provided a screw, comprising: a shaft, a thread helically wrapped around said shaft, an upper surface and a lower surface of said thread, and each of said upper surface and said lower surface including undulations.

According to another embodiment of the present invention, there is provided, a screw, comprising: a male screw member, a female screw member, a first thread wrapped around said male screw member along a first helical path, a second helical thread wrapped within said female screw member along a second helical path, at least one of said first helical thread and said second helical thread having an undulating surface along at least one of said first helical path and said second helical path, said male screw member being at least partially threadably inserted into said female screw member, and a lubricating oil applied between said first thread of said male screw member and said second thread of said female screw member.

According to another embodiment of the present invention, there is provided, a screw for adjusting a position of a slide in a machine press, comprising: a male screw member, a female screw member, a first thread wrapped around said male screw member along a first helical path, a second thread wrapped within said female screw member along a second helical path, at least one of said first thread and said second thread including an undulating surface along at least one of said first helical path and said second helical path, and said male screw member being at least partially threadably inserted into said female screw member.

According to yet another embodiment of the present invention, there is provided a screw, comprising: a male screw member including a first thread wrapped around said male screw member along a first helical path, a female screw member including a second thread wrapped within said female screw member along a second helical path, said male screw member being at least partially threadably inserted into said female screw member, a lubricating oil between said first thread which is meshed with said second thread, at least one of said first thread and said second thread having undulations along an outer surface of said at least one of said first thread and said second thread, said undulations including an alternating pattern of upwardly sloping portions and downwardly sloping portions of said outer surface along at least one of said first helical path and said second helical path, and said undulation causing a wedging action against said lubricating oil when said male screw member is rotated relative to said female screw member.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
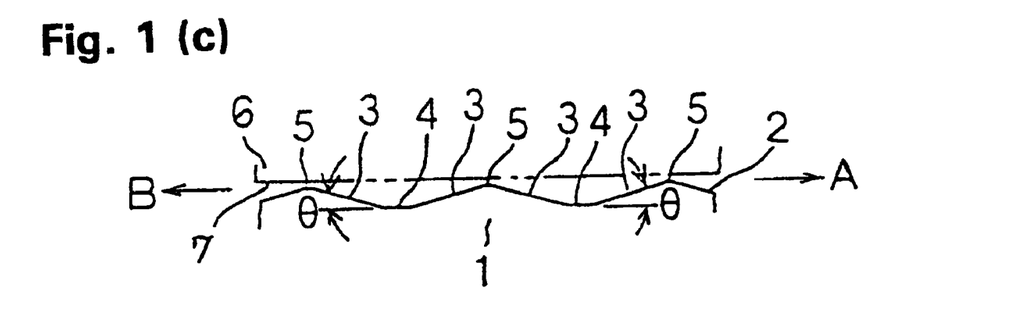
FIG. 1(a) is a schematic perspective drawing of the male screw in an embodiment of the present invention.
FIG. 1(b) is a plan drawing of the screw surface of the male screw of FIG. 1(a).
FIG. 1(c) is a side-view drawing of the screw surface of the male screw of FIG. 1(a).

Referring to FIGS. 1(a)–1(c), upper screw surface 2 and lower screw surface 2' are the surfaces on either side of a thread on a male screw 1. Sloped surfaces 3 are disposed continuously along upper screw surface 2 and lower screw surface 2'. Sloped surfaces 3 alternately rise and fall along sliding directions A and B. Both the rising and the falling sloped surfaces 3 have a same incline angle θ. Depressions 4 and projections 5 are continuously alternately placed on upper screw surface 2 and lower screw surface 2' between each adjacent pair of sloped surfaces 3. Depressions 4 and projections 5 are transverse to sliding directions A and B. Sloped surfaces 3, depressions 4, and projections 5 create a specific pattern of undulations on upper screw surface 2 and lower screw surface 2'.

Referring to FIG. 1(c), the dotted line represents a screw surface 7 of a female screw 6, in which male screw 1 is threaded. Male screw 1 meshes with screw surface 7 of female screw 6. Depressions and projections (not shown in FIG. 1(c)) can also be formed on screw surface 7 of female screw 6.

Figure 2:
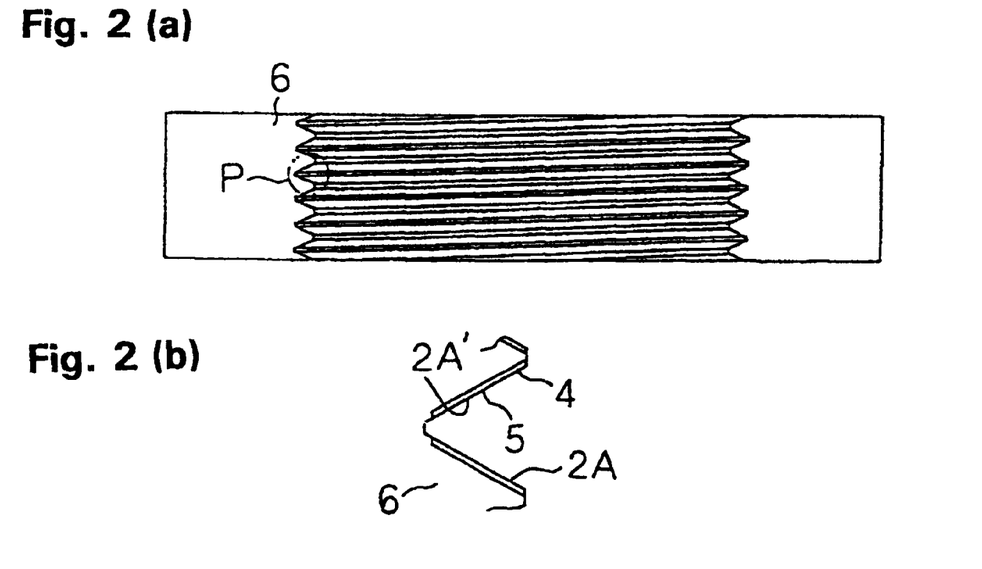
FIG. 2(a) is a vertical cross-section drawing of the female screw in an embodiment of the present invention.
FIG. 2(b) is an enlarged drawing of area P in FIG. 2(a).

Referring to FIGS. 2(a) and 2(b), depressions 4 and projections 5 are formed on upper female screw surface 2a and lower female screw surface 2a' as described above.

Figure 3:
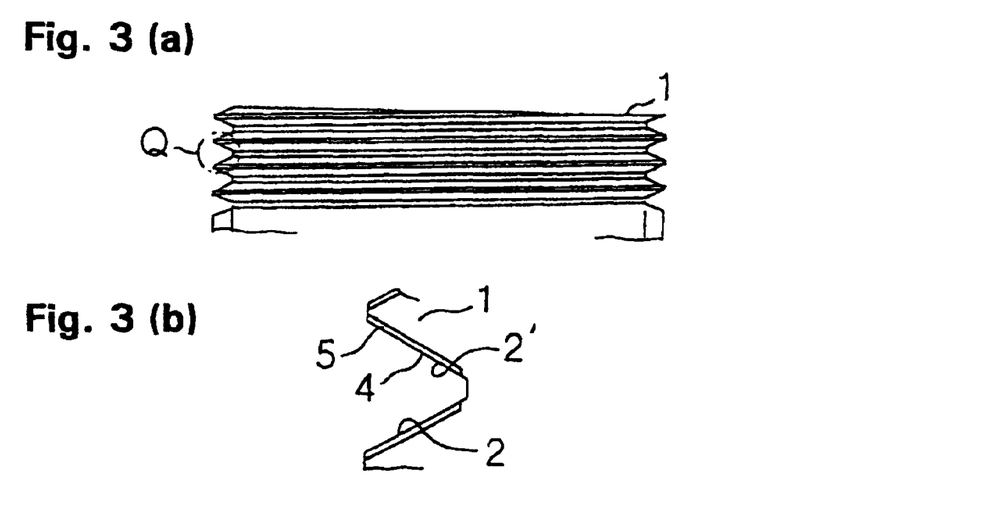
FIG. 3(a) is a schematic front-view drawing of the male screw in an embodiment of the present invention.
FIG. 3(b) is an enlarged drawing of area Q in FIG. 3(a).

Referring to FIGS. 3(a) and 3(b), depressions 4 and projections 5 are formed on upper male screw surface 2 and lower male screw surface 2' as described above.

Figure 4:
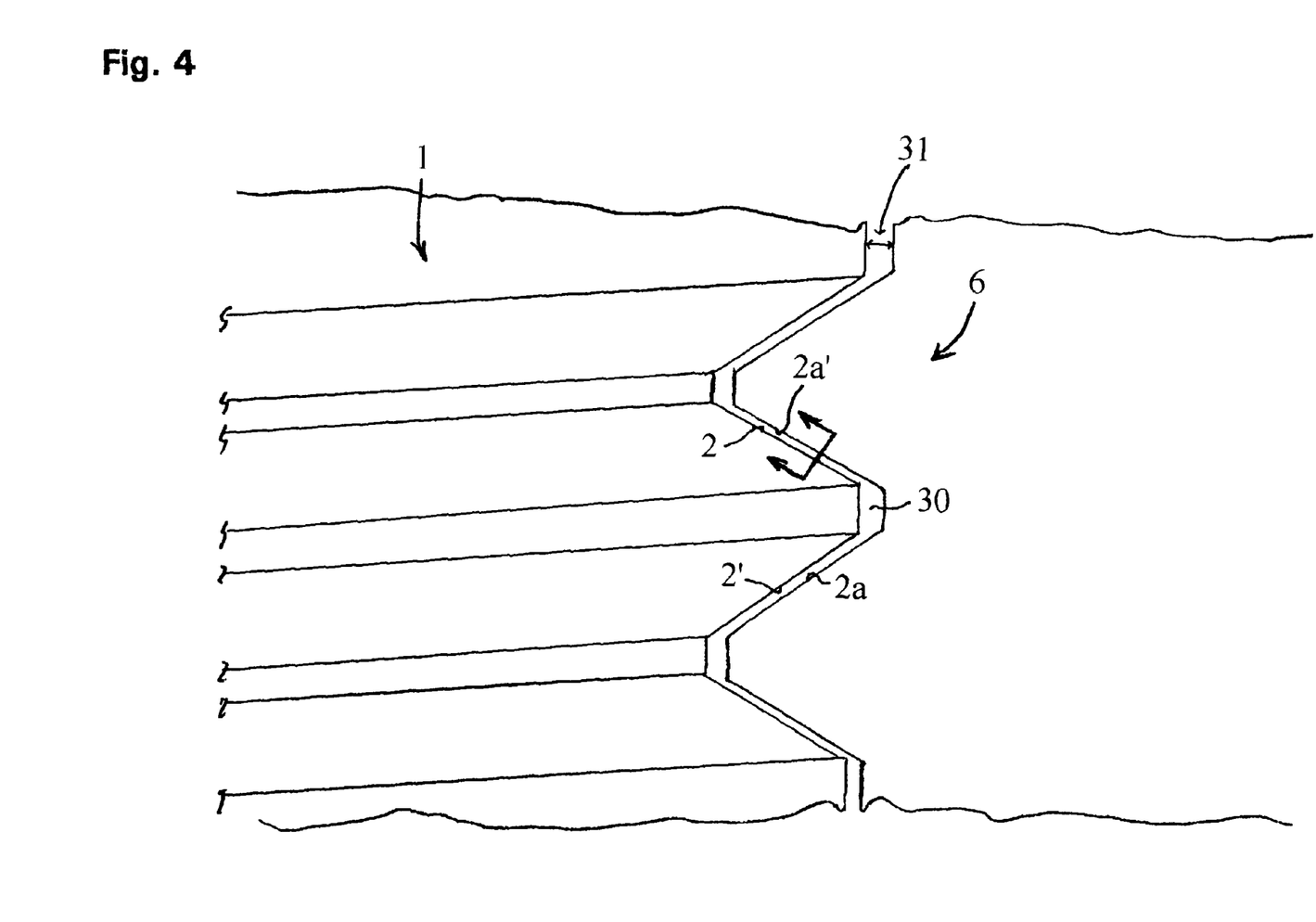
FIG. 4 shows the interface between threads of male screw and female screw of the present invention.
Figure 5:
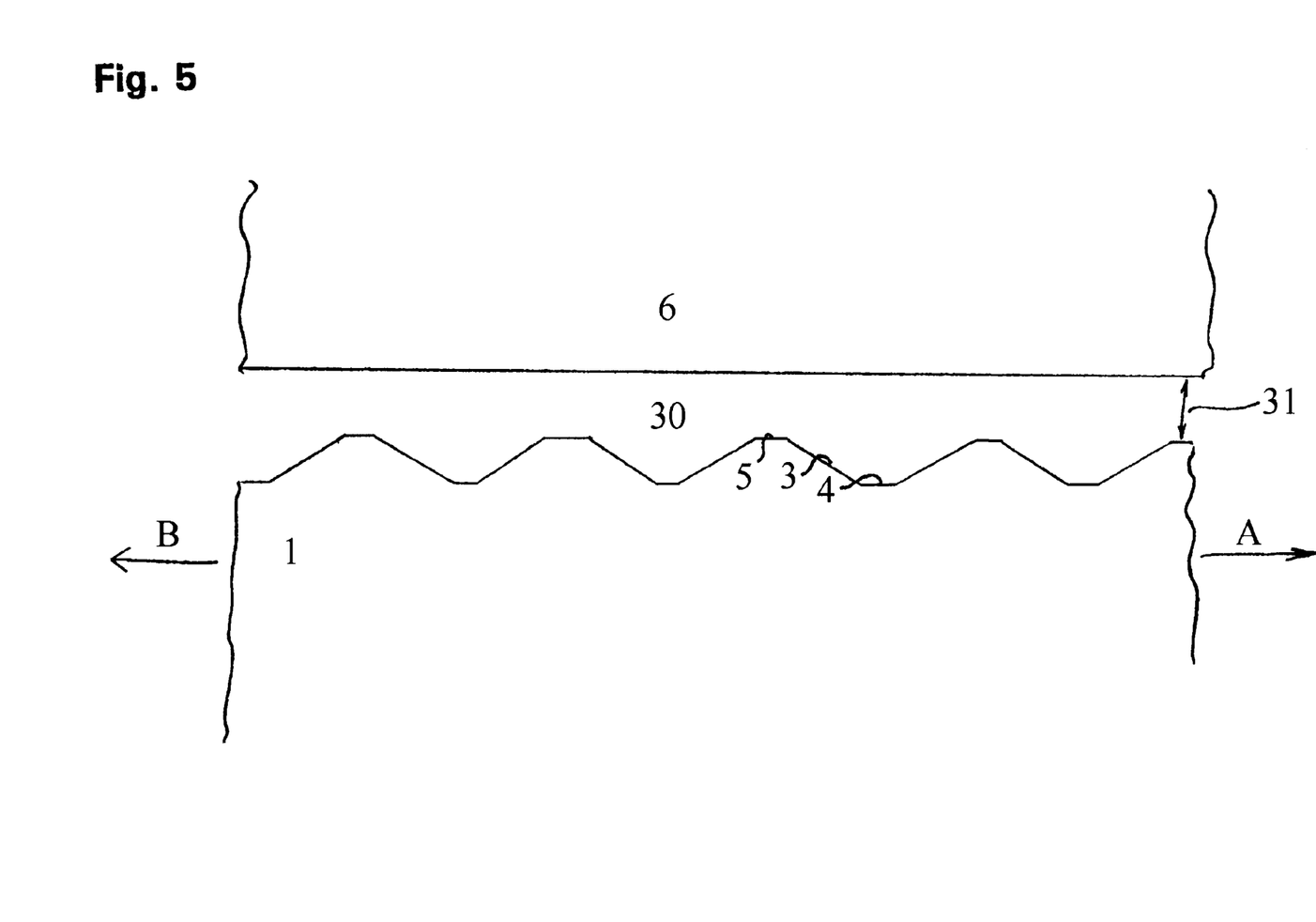
FIG. 5 shows a sectional view of the meeting of an upper surface of a thread on the male screw and a lower surface of a thread on the female screw along V—V of FIG. 4.

Referring now to FIGS. 4 and 5, a gap 31 exists between male screw 1 and female screw 6 when male screw 1 is meshed with female screw 6. Gap 31 is filled with a lubricating oil 30. When male screw 1 is threaded into or out of female screw 6, upper and lower male screw surfaces 2 and 2' move across lower and upper female screw surfaces 2a' and 2a along directions A or B, respectively. FIG. 5 specifically shows the interface between upper male screw surface 2 and lower female screw surface 2a'. As male screw 1 is turned, upper male surface 2 moves across lower female screw surface 2a' in a direction A or B shown in FIG. 5. As male screw 1 moves in direction A, a leading sloped surface 3' and a trailing sloped surface 3" surround each projection 5. A wedging action of lubricating oil 30 against leading sloped surface 3' occurs. That is, as the leading edge 3' moves in direction A, lubricating oil 30 between leading sloped surface 3' and female screw 6 is wedged against female screw 6 by the movement of leading sloped surface 3'. The wedging action creates a force which urges upper surface 2 away from female screw surface 7. This wedging action takes place at each leading sloped surface 3' on upper male surface 2. Referring also to FIG. 4, the lower male screw surface 2' creates the same force against upper female screw surface 2a. Since lubricating oil 30 is between male screw 1 and female screw 6 for the entire length of the thread, wear on upper and lower male surfaces 2 and 2' and upper and lower female surfaces 2a and 2a' is minimized.

The magnitude of incline angle θ formed between sloped surfaces 3 and sliding directions A and B is based on the intended sliding speed of male screw 1 to provide the most effective wedging action with the lubricating oil. The widths along the sliding direction of depression 4 and projection 5 are based on the same criteria. In the preferred embodiment, each of sloped surfaces 3 has the same incline angle θ and the size of each projection and depression is uniform. However, the present invention could have different sized projections and depressions and have sloped surfaces of different incline angles and still produce the wedging action which reduces wear of the parts.

Figure 6:
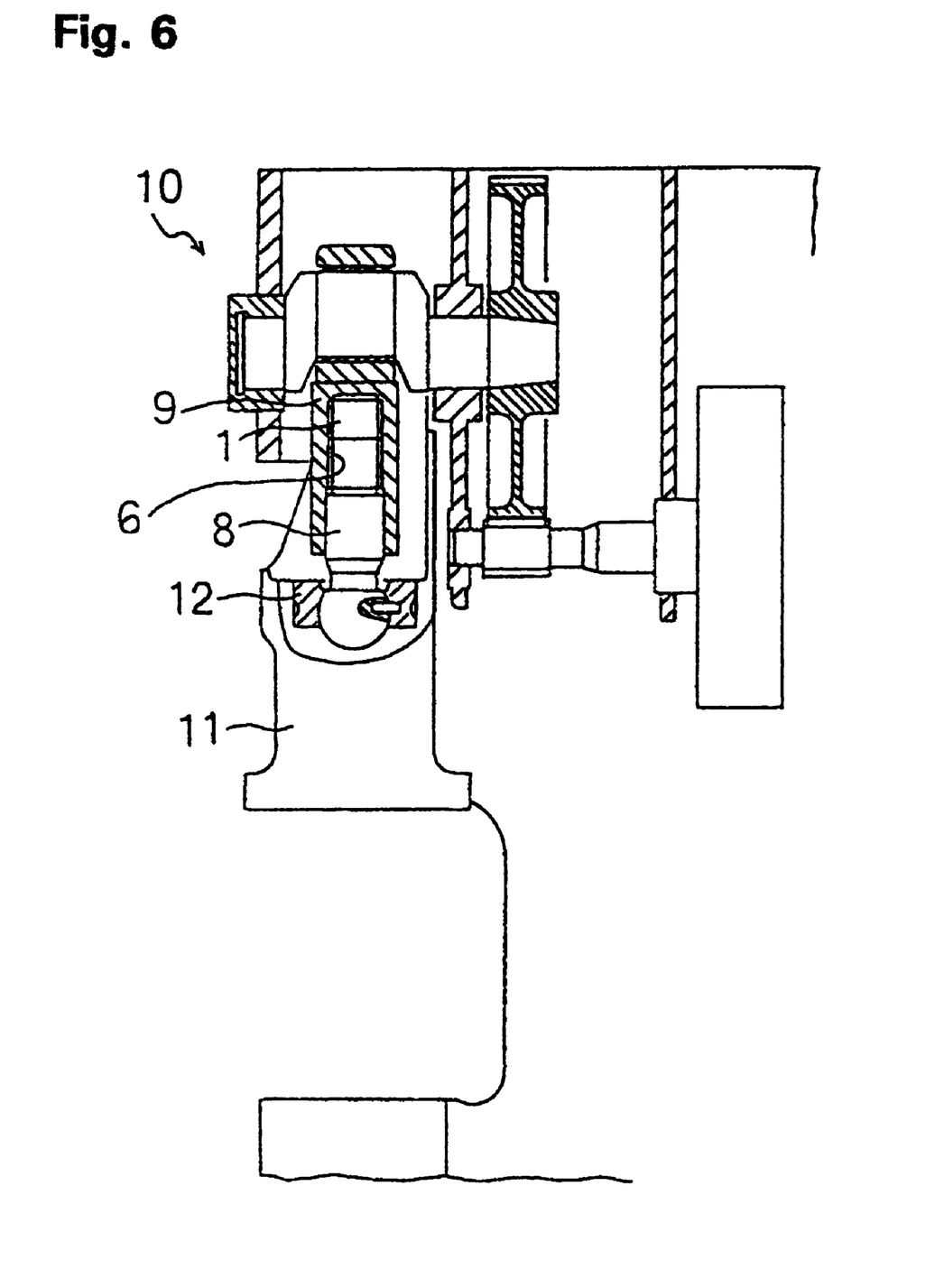
FIG. 6 is a schematic side-view drawing of a C-frame press in which the present invention is implemented.

Referring to FIG. 6, male screw 1 described above is connected to an adjustment screw 8. Female screw 6 is connected to a connecting rod 9. Adjustment screw 8 and connecting rod 9 are installed in a C-frame machine press 10.

C-frame machine press 10 includes a slide 11 which is moved up and down to effect the function of C-frame machine press 10. C-frame machine press 10 further includes a worm wheel 12 which is rotated at a high speed. Worm wheel 12 is rotatably supported on slide 11. An upper die (not shown in FIG. 6) is connected to a bottom of slide 11. Adjustment screw 8 rotatably engages worm wheel 12. Adjustment of the die height is accomplished when worm wheel 12 is rotated to adjust the vertical position of adjustment screw 8. The weight held by the threads of male screw 1 and female screw 6 includes the weight of slide 11 itself, which is large due to the nature of the machine press, so a large load is applied to upper and lower male screw surfaces 2 and 2' and upper and lower female screw surfaces 2a, and 2a'.

Since the die height must be adjusted for each new die which is installed in C-frame machine press 10, there are significant advantages in forming sloped surfaces 3, depressions 4, and projections 5, as described above on the screw surface of male screw 1 and/or female screw 6, so that wear of the surfaces of male screw 1 and female screw 6 is minimized.

Figure 7:
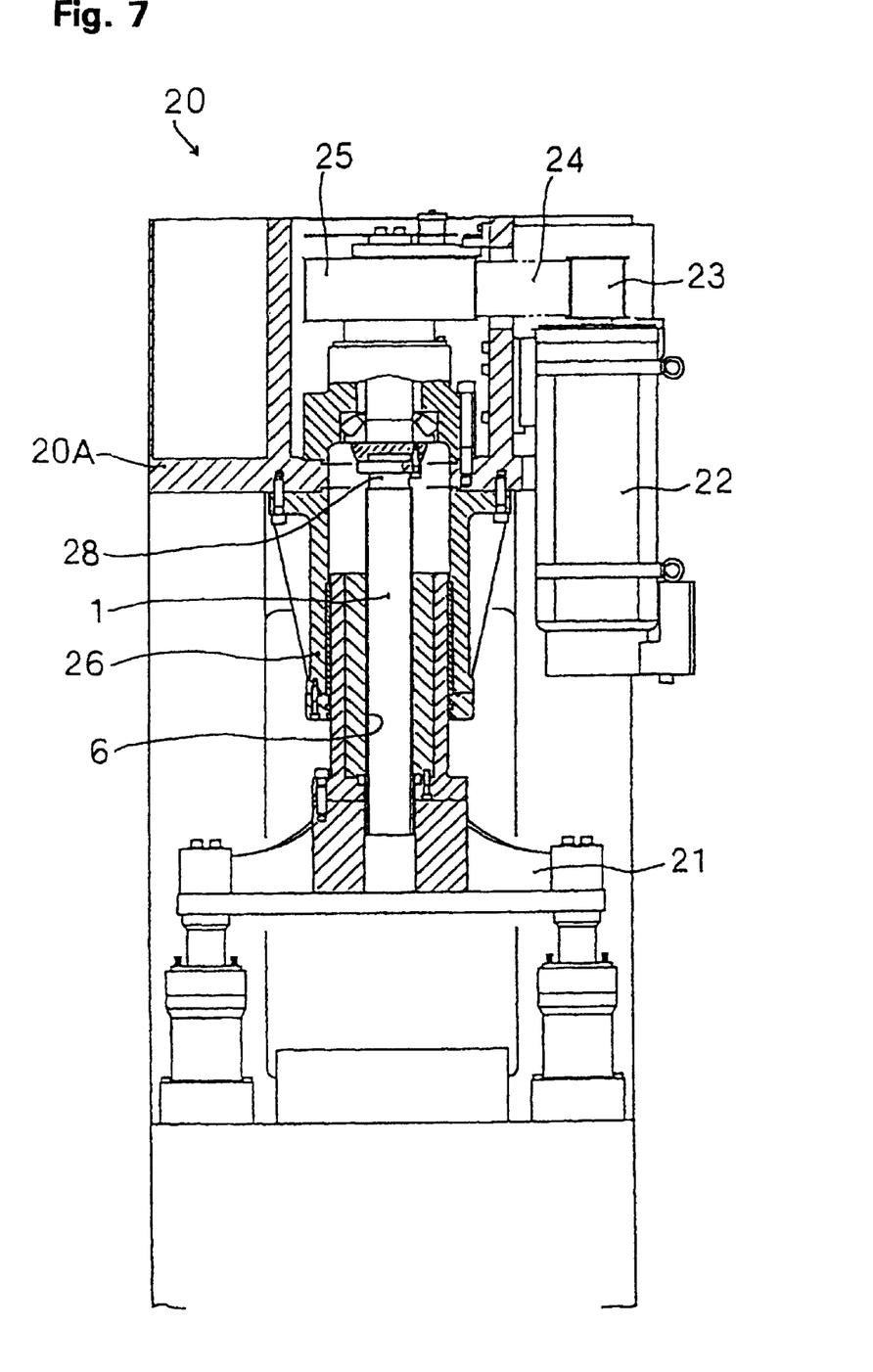
FIG. 7 is a schematic side-view drawing of a screw-type machine press in which the present invention is implemented.

Referring now to FIG. 7, there is shown a screw-type machine press 20. Male screw 1 is disposed on an adjustment screw 28. A force from a main motor 22 is transferred via pulleys 23, 25 and a belt 24 to rotate adjustment screw 28. Female screw 6, which engages with male screw 1, is disposed on a slide 21. Slide 21 is guided up and down by a flange 26 disposed on a frame 20a.

As the description above makes clear, the wedging action due to the film of lubricating oil 30 between the male and female screw surfaces allows the screw surfaces to slide against each other at high speeds without having the oil film on the sliding surface break even if a large load is applied between the screw surfaces. Thus, wear resistance is low and wear is reduced.

Furthermore, the conversion of rotational and linear motion between the male screw and the female screw is smooth and there in no undue stress or other negative effects on other related mechanisms.

The wedging actions of the oil film is larger at higher speeds. Even if the clearance between the screw surfaces is large, high precision is maintained by the oil film. This makes the present invention suited for high speeds and provides significant advantages in practical applications.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A male screw device, comprising:
   a shaft;
   a helical thread around said shaft;
   an upper surface and a lower surface of said thread;
   said upper surface of a first thread meeting said lower surface of an adjacent thread at said shaft without interference from any protuberances;
   at least one of said upper surface and said lower surface including a pattern of undulations designed to create a wedging action on a lubricating oil between said undulations and a female portion in which said screw is threaded, when said screw is rotated within said female portion;
   said pattern of undulations extending along an entire surface of said at least one;
   said pattern of undulations having sloped surfaces rising and falling with an incline angle less than 90 degrees; and
   said sloped surfaces being transverse to a sliding direction of said helical thread when said male screw is rotated within said female portion.

2. The screw of claim 1 wherein said undulations include alternating projections and depressions.

3. The screw of claim 2, wherein said each of said upper surface and said lower surface further includes sloped surfaces between said alternating projections and depressions.

4. The screw of claim 3, wherein each of said sloped surfaces has a same first angle of incline.

5. A screw, comprising:
   a male screw member;
   a female screw member;
   a first helical thread around said male screw member along a first helical path;
   a second helical thread within said female screw member along a second helical path;
   at least one of said first helical path and said second helical path having a pattern of undulations;
   said pattern of undulations having sloped surfaces rising and falling with an incline angle less than 90 degrees;
   said sloped surfaces being transverse to a sliding direction of said first helical thread when said male screw member is rotated within said female screw member;
   said male screw member being at least partially threadably inserted into said female screw member;
   a lubricating oil between said first thread of said male screw member and said second thread of said female screw member; and
   said undulations being designed to create a wedging action against the other of said at least one of said first helical thread and said second helical thread when said male screw member is threaded into or out of said female screw member.

6. The screw of claim 5 wherein, said undulating surface includes alternately placed upwardly sloping surfaces and downwardly sloping surfaces along one of said first helical path and said second helical path.

7. The screw of claim 6 wherein, said undulating surface further includes alternating projections and depressions between said upwardly sloping surfaces and said downwardly sloping surfaces.

8. The screw of claim 6, wherein each of said upwardly sloping surfaces and said downwardly sloping surfaces has a first incline angle.

9. The screw of claim 5, wherein said undulations are designed to optimize said wedging action at a set speed of rotation of said mate screw member with respect to said female screw member.

10. A screw for adjusting a position of a slide in a machine press, comprising:
    a male screw member;
    a female screw member;
    a first helical thread on said male screw member;
    a second helical thread within said female screw member;
    at least one of said first thread and said second thread including a pattern of undulations;
    said pattern of undulations having sloped surfaces rising and falling with an incline angle less than 90 degrees;
    said sloped surfaces being transverse to a sliding direction of said first helical thread when said male screw member is threadably inserted within said female screw member; and
    said male screw member being at least partially threadably inserted into said female screw member.

11. A screw, comprising:

a male screw member including a first helical thread around said male screw member;

a female screw member including a second helical thread wrapped within said female screw member;

said male screw member being at least partially threadably inserted into said female screw member;

a lubricating oil between said first helical thread which is meshed with said second helical thread;

at least one of said first helical thread and said second helical thread having undulations along an outer surface;

said undulations including an alternating pattern of upwardly sloping portions and downwardly sloping portions of said outer surface along a length of said at least one of said first helical thread and said second helical thread;

said upwardly sloping portions and said downwardly sloping portions having an incline angle less than 90 degrees;

said upwardly sloping portions and said downwardly sloping portions being transverse to a sliding direction of said first helical thread when said male screw member is threadably inserted within said female screw member; and said undulations causing a wedging action against said lubricating oil when said male screw member is rotated relative to said female screw member.

\* \* \* \* \*